Figure 1:
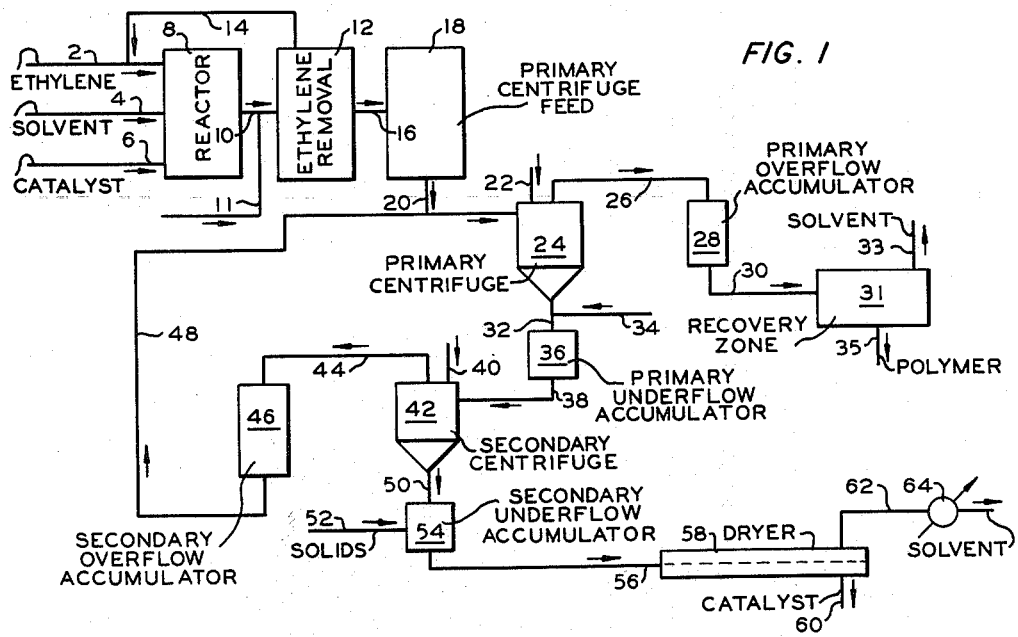

Nov. 24, 1959     J. E. COTTLE     2,914,518
POLYMERIZATION CATALYST RECOVERY
Filed Aug. 24, 1956

INVENTOR.
J. E. COTTLE
BY Hudson and Young
ATTORNEYS

¹

United States Patent Office 2,914,518
Patented Nov. 24, 1959

2,914,518

POLYMERIZATION CATALYST RECOVERY

John E. Cottle, Bartlesville, Okla., assignor to Phillips Petroleum Company, a corporation of Delaware Application August 24, 1956, Serial No. 606,140

11 Claims. (Cl. 260—94.9)

This invention relates to a catalyst recovery process. In another aspect it relates to the removal of solid subdivided polymerization catalyst from an olefin polymer.

In many instances the problem of recovering or removing solid polymerization catalyst from a polymer material, for example, from a solid polymer of ethylene, entails substantial difficulties because of the physical characteristics of the polymer. The polymer tends to be very sticky when wet and is inclined to agglomerate and adhere to process equipment. The polymerization process is preferably carried out in the presence of a solvent material whereby the polymer during its formation and after its removal from the reaction zone can be maintained in solution. This use of a solvent material substantially overcomes the sticking tendency of the polymer. The volatility of the solvents employed and the difficulty of keeping the polymer in solution make it desirable to carry out the polymerization process and the subsequent catalyst separation and recovery at elevated temperatures and pressure. Filtration has been used to separate catalyst from the polymer; however, it is difficult to carry out this type of separation by filtration because of the large amounts of filter aid often required and the problems involved in recovering same. In addition, the filtration effectiveness is variable and it is sometimes difficult to maintain a consistently good separation by the use of this recovery method.

It is an object of this invention to provide an improved process for the recovery of solid polymerization catalyst from an olefin polymer.

Another object of the invention is to provide an improved process for the recovery of solid polymerization catalyst from a solution of an olefin polymer by centrifugation.

Another object of this invention is to provide an improved process for the recovery of chromium oxide catalyst from a solution of ethylene polymer by a two-stage centrifugation.

These and other objects of the invention will become more readily apparent from the following detailed description and discussion.

In the method of this invention, the foregoing objects are realized broadly by introducing a stream containing catalyst, polymer and solvent to a first centrifuging zone wherein separation of catalyst and polymer takes place. The major portion of the material introduced to this zone is withdrawn as overflow product and comprises a mixture of polymer and solvent substantially free of catalyst. A smaller underflow stream containing catalyst, solvent and polymer is also withdrawn and introduced to a second centrifuging zone wherein the separation process is repeated. The major stream withdrawn from the second zone comprises polymer and solvent containing some catalyst, and this material is recycled to the first centrifuging zone. A second underflow stream comprising catalyst, solvent and a minor amount of polymer is also withdrawn from the second zone and this material is subjected to further treatment for the separation and recovery of the solvent and catalyst contained therein.

In one aspect of the invention, the aforedescribed two-stage centrifugation process is carried out at an elevated temperature and pressure whereby substantially all of the polymer is retained in solution during the operation.

In another aspect of the invention, the mixture of catalyst, solvent and solution entering the first centrifuging zone is cooled to a temperature level whereby catalyst agglomeration occurs and separation of catalyst is facilitated. Hot solvent is added to the catalyst-rich underflow stream from the first centrifuging zone whereby the temperature is returned to a level sufficient to dissolve polymer precipitated with and upon the catalyst in the agglomeration step. This stream is then treated in the second centrifuging zone as described.

This invention is applicable in general to the treatment of olefin polymers such as, for example, polymers or copolymers of monoolefins like ethylene, propylene, butylene, etc.; also, copolymers of monoolefins and diolefins such as butadiene, isoprene, etc. These polymers are prepared usually by contacting the olefin to be polymerized with a catalyst in the presence of a solvent or diluent material at an elevated temperature and pressure. A number of catalytic materials can be used for the purpose of polymerizing olefins, the most desirable being chromium oxide, preferably containing hexavalent chromium, with silica, alumina, zirconia, thoria, silica-alumina, etc. These catalysts can be prepared, for example, by contacting soluble salts of chromium with silica, alumina, thoria, etc., for a sufficient period of time to impregnate the latter material. Following this, excess liquid is removed, for example, by filtering after which the solid catalysts are dried and activated at temperatures in the range of 450° F. to 1500° F. under non-reducing conditions for several hours. For a detailed discussion of the catalysts, their composition and their methods of preparation, reference can be had to the copending application of Hogan and Banks, Serial No. 573,877, filed March 26, 1956, now Patent No. 2,825,721, wherein the catalysts are discussed in detail. These and other solid catalysts or catalysts containing a solid component can be treated in the method of this invention.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is maintained at a sufficient level to assure a liquid phase reaction, that is, at least about 100 to 300 p.s.i.g., depending upon the type of feed material and the polymerization temperature. Higher pressures up to 500 to 700 p.s.i.g. or higher can be used, if desired. The catalyst concentration in the reactor varies from between about 0.01 and about 10 percent by weight. Generally, it is desirable to provide a reactant residence time of between about 15 minutes and about 12 hours.

The use of a diluent in the polymerization reaction in general serves two purposes. Since the reactions are usually exothermic in nature, the presence of a quantity of diluent provides a method for obtaining close control of the reaction temperature. In addition, as previously stated, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic paraffins having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents can also be used; however, in some instances they (or impurities therein) tend to shorten the catalyst life, therefore, their use will depend on the importance of catalyst life. All of the foregoing and in addition, other hydrocarbon diluents which are relatively inert and in the liquid state at the reaction conditions may also be employed in carrying out the reaction of olefins to form solid polymers.

Although the invention is applicable to polymerization systems in general, it finds particular use in processes for the polymerization of 1-olefins having a maximum of 8 carbon atoms per molecule and no branching nearer the double bond than the 4-position; and more particularly in processes for the polymerization of ethylene under conditions which provide polymers of ethylene which have a density of at least 0.94 and preferably 0.96 or higher and a crystallinity of at least 70 percent and preferably at least 80 percent at ambient temperatures. While the polymerization of ethylene provides a preferred embodiment of the invention, it is not intended that the scope of the invention be limited thereby but that any of the other processes described are also within the invention.

One method of preparing polymers of olefins is described in detail in a copending application of Hogan and Banks, Serial No. 573,877, filed March 26, 1956, now Patent No. 2,825,721. This particular method utilizes a chromium oxide catalyst, preferably containing hexavalent chromium, with silica, alumina, silica-alumina, zirconia, thoria, etc. In the method of the Hogan et al. application, olefins are polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and under a pressure sufficient to maintain the reactant and diluent in the liquid states. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity at ambient temperatures.

In carrying out the invention, in one embodiment thereof, a polymerization reaction product containing solid catalyst and polymer solution is introduced to a primary centrifuging zone. Within this zone, a preliminary separation of catalyst from polymer solution takes place. Two streams are withdrawn from the centrifuging zone, an overflow stream containing essentially polymer and solvent and an underflow stream containing catalyst, polymer and solvent. The quantity of overflow relative to the underflow is controlled so that the former stream is substantially free of catalyst. As a result, the catalyst-rich underflow stream contains a substantial amount of polymer. For the purpose of recovering this material, the latter stream is introduced to a secondary centrifuging zone wherein another separation of catalyst and polymer is effected. The quantity of overflow relative to underflow from this zone is controlled to provide a maximum recovery of polymer. As a result, the secondary overflow stream contains in addition to polymer, a quantity of catalyst. Separation of the catalyst to obtain a polymer product of high purity is effected by recycling this overflow to the first centrifuging zone. The catalyst-rich underflow from the second zone contains essentially catalyst and solvent, with a minor quantity of polymer. This stream is subjected to further processing, including drying, to recover the solvent contained therein. The dried catalyst can be discarded or it can be roused in the polymerization process, preferably after regeneration. It is also within the scope of the invention to recycle the catalyst-rich underflow to the polymerization reactor if desired.

It is desirable that the polymer-solvent feed introduced to the first centrifuging zone contain a high concentration of solvent. Usually, the polymer concentration of this stream is maintained between about 2 and about 6 percent by weight. The two-stage centrifugation is carried out in a temperature range which exceeds the precipitation temperature of the polymer, usually between about 200 and about 400° F. Sufficient pressure is maintained on the centrifuging zones and accompanying equipment to maintain the solvent in the liquid state at the process temperatures employed. Usually, the pressure is held between about 25 and about 200 p.s.i.g. When it is desirable to maintain the pressure above the vapor pressure of the solvent the additional pressure can be provided by introducing to the centrifuging zones an inert gas such as nitrogen, methane, ethane, etc.

As previously mentioned, in one aspect of the invention, the separation of catalyst and polymer is effected by agglomerating the catalyst prior to the introduction of catalyst and polymer solution to the first centrifuge. In this embodiment of the invention, agglomeration of the catalyst is carried out by lowering the temperature of the feed to the first centrifuging zone to below the temperature at which the polymer begins to precipitate from solution; usually, this is between about 180° F. and about 225° F. Preferably, when treating a solution containing ethylene polymer, the temperature is lowered to at least 200° F. The desired decrease in temperature can be effected by any suitable means such as, for example, by indirect heat exchange or by introducing cool solvent to the feed to the first centrifuging zone. Agglomeration is also aided by agitation during the temperature reduction step.

Precipitation of a portion of the polymer from solution provides agglomeration of the catalyst which is then very effectively separated from the major portion of the remaining polymer by centrifuging. The catalyst enriched underflow leaving the first centrifuging zone contains polymer precipitated on/or with the catalyst. To provide recovery of this polymer in the second centrifuging zone, it is necessary to increase the temperature of this stream to a level above the solution temperature of the precipitated polymer. For ethylene polymer, a temperature of at least about 210° F. is preferred. The desired temperature level can be provided by any conventional means, such as by indirect heat exchange or by the introduction of hot solvent to the underflow. The second centrifuging step and subsequent solvent recovery from the secondary underflow are then carried out in the manner already described.

The degree of solid separation attained in the aforedescribed processes is dependent on a number of factors, including catalyst size and distribution, relative quantity of the overflow and underflow streams and the quantity of polymer, solids and solvent in said streams. More usually, the catalyst solids range in size from between about 0.01 micron to about 100 microns. It is preferable that the polymer or at least the major portion thereof remain in solution during separation of the catalyst. This is accomplished by a combination of elevated temperature and the presence of a large quantity of solvent material. More usually, it is desirable that the solution entering the centrifuging system contain a polymer concentration of between about 2 percent and about 6 percent by weight based on the solvent and not exceeding about 15 percent by weight. The volume ratio of overflow to underflow in the first step of the catalyst separation, namely in the first centrifuging zone varies from between about 1 to 1 to about 20 to 1 and preferably from about 3 to 1 to about 8 to 1. When operating within these ranges, it is possible to provide as overflow a solution containing between about 2 and about 6 percent of polymer by weight based on the solvent and having a catalyst content ranging from 0.0 to about 0.05 percent by weight based on the polymer and preferably from 0.0 to about 0.02 percent. The underflow from the first stage which comprises only a minor portion of the total solution introduced to the centrifuging system also contains between about 2 and about 6 percent polymer by weight based on the solvent and between about 2 and about 10 percent catalyst by weight based on the polymer.

Inasmuch as the underflow from the first stage of centrifugation contains a substantial amount of polymer, it is desirable that this stream before being sent to the second stage be diluted with solvent so that a minimum of polymer will be present in the underflow from the second stage. The amount of solvent added at this point is usually between about 0.2 and about 4 pounds of solvent per pound of solvent present in the underflow from the first stage and more usually between about 0.8 and about 2 pounds per pound. The second centrifuging stage operates with an overflow to underflow volume ratio of between about 5 and about 40 to 1 and preferably between about 15 and about 25 to 1. The overflow from this stage, which is recycled to the first stage, usually contains between about 0.5 and about 5 percent polymer by weight based on the solvent and between about 0.01 and about 1 weight percent catalyst by weight, based on the polymer. The underflow from the second stage contains the major amount of the catalyst present in the original feed material, a small amount of polymer and a major amount of solvent. Usually the polymer is present in an amount between about 0.5 and about 10 weight percent based on the solvent and the catalyst comprises between about 5 and about 50 percent by weight based on the polymer.

As stated, the material leaving the bottom of the secondary centrifuging zone is principally catalyst suspended in solvent, however, it contains sufficient polymer associated with the catalyst to provide a sticky sludge type of material which is difficult to handle when wet and which, when dried for the recovery of solvent, tends to form a hard mass which is hard to break up.

In one embodiment of the invention, a more easily handled residue is provided by mixing with the secondary underflow a granular material such as sand, dried catalyst, etc. If a filter is provided for the treatment of the overflow solution from the first centrifuge, for example, a filter utilizing a pre-coat material and filter aid, catalyst cake from this filter provides a suitable granular material for addition to the secondary underflow. The total material is then treated in conventional equipment, such as a conveyor-dryer or a steam tube dryer for the removal of solvent. The recovered solvent is usually recycled to a part of the aforedescribed system. The dried catalyst mass can be discarded or it can be reused in the process usually after regeneration.

In another embodiment of the invention the underflow from the second centrifuging zone is contacted with cold solvent under conditions of agitation, whereby the mixture is reduced to a temperature level below the melting point of the polymer. The result is to precipitate polymer so that an agglomerate of polymer and catalyst in the solvent is formed. Preferably, the solvent is introduced in sufficient quantity and at a temperature level to form a mixture having a temperature between about 150° F. and about 250° F. and preferably below about 200° F. Following this step, excess solvent can be removed by conventional means such as by decantation or filtering, after which the polymer-catalyst agglomerate can be dried and further treated in a similar manner to that described above. If desired, the cooling required to effect agglomeration can be provided by means other than the use of cold solvent, for example, by cooling the underflow by indirect heat exchange, autorefrigeration, etc.

Separation of polymer and polymerization catalyst by the aforedescribed methods of operation provide substantial economic and operating advantages over other methods of solid recovery, such as, for example, filtration in that the equipment is less complex, there is no problem of filter aid recovery.

Figure 2:
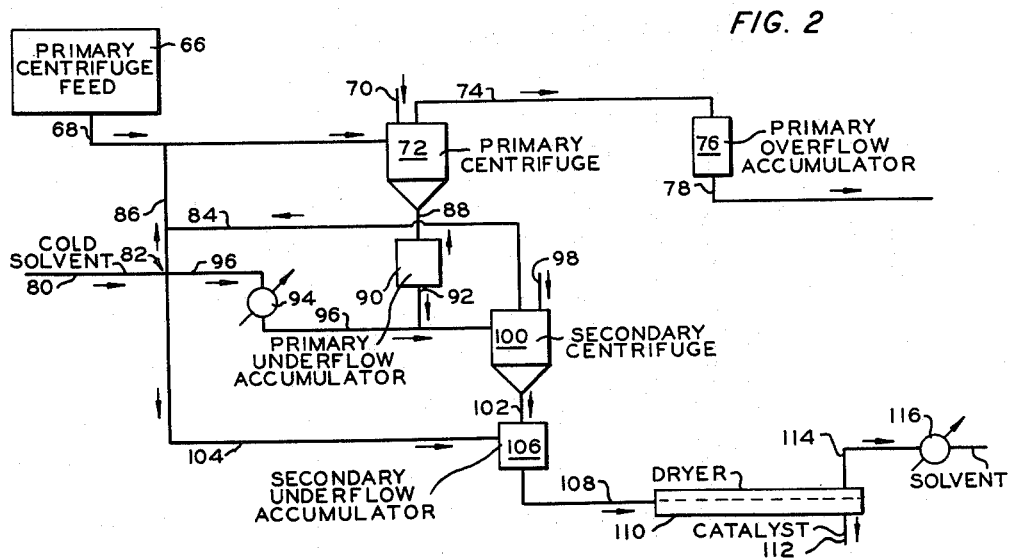

In order to more clearly describe the invention and provide a better understanding thereof, reference is had to the accompanying drawings of which, Figure 1 is a diagrammatic illustration of a processing system and apparatus suitable for separating polymer and catalyst by centrifugation under elevated temperature and pressure, followed by solids addition to the separated catalyst and drying of the solids mixture for the recovery of catalyst and solvent, and Figure 2 illustrates a similar system for the separation of polymer and catalyst in which centrifugation is preceded by catalyst agglomeration with cold solvent and recovery of catalyst from the secondary underflow is provided by agglomeration with cold solvent, followed by drying.

Referring to Figure 1, ethylene, cyclohexane solvent and subdivided chromium oxide catalyst, slurried in cyclohexane, are introduced to reactor 8 through conduits 2, 4 and 6, respectively. Within the reactor, suitable reaction conditions are maintained, namely, a temperature of about 285° F. and a pressure of about 500 p.s.i.a., whereby a portion of the ethylene feeds is converted to solid ethylene polymer. Agitation of the reaction mixture is provided by a suitable mixing means (not shown) whereby a substantially uniform suspension of catalyst in liquid is maintained in the reactor. A stream of material containing polymer, cyclohexane, catalyst and unconverted ethylene is withdrawn from the reactor through conduit 10. At this point, additional cyclohexane is introduced to the effluent via conduit 11 and the total stream is then passed through a heater (not shown) wherein the temperature is increased to assure dissolution of the entire polymer product in the cyclohexane. The effluent stream is then introduced to an ethylene removal zone 12 wherein unconverted ethylene is separated and returned to the reactor 8 through conduit 14. Following this separation, the reactor effluent, now containing polymer, solvent and catalyst, is introduced to a primary centrifuge feed tank 18. From this vessel, material is withdrawn through conduit 20 and introduced to the primary centrifuge 24. Before entering centrifuge 24, the feed material is increased in volume by the addition of overflow material from the secondary centrifuge overflow accumulator 46 through conduit 48. In addition to the primary centrifuge 24, there is provided a secondary centrifuge 42. Both of the centrifuges are adapted to the separation of solids from liquids at elevated temperatures and pressures. Each centrifuge is constructed to rotate at an extremely high velocity and to provide an overflow product stream of low solids content and an underflow stream concentrated in solids. In order to prevent vaporization of solvent during centrifugation a positive pressure is applied to each centrifuge by introducing thereto an inert gas, in this instance, nitrogen, through conduits 22 and 40 respectively. The overflow from the primary centrifuge 24 exits therefrom through conduit 26 and accumulates in the primary overflow accumulator 28. This stream, which contains polymer and solvent and is substantially free from catalyst solids forms the principal product of the process and is removed from the unit through conduit 30. A further separation between polymer and solvent can be effected in recovery zone 31, polymer and solvent being removed through conduits 35 and 33, respectively. The primary centrifuge underflow containing the remainder of the solvent, substantially all of the catalyst solids and a minor proportion of the polymer is passed from the centrifuge through conduit 32 into the primary underflow accumulator 36. For the purpose of providing a minimum loss of polymer from the secondary centrifuge, a quantity of additional solvent is introduced to the primary underflow through conduit 34. The material in accumulator 36 is removed therefrom through conduit 38 and introduced into secondary centrifuge 42 wherein another separation of solid and polymer is effected. A different type of separation is effected in this centrifuge in that the overflow therefrom is controlled to provide a quantity of solids in this stream, the purpose being to effect maximum recovery of polymer in this stage. The overflow is returned to the primary centrifuge through conduit 44 and secondary overflow accumulator 46, as previously described. The underflow from the secondary centrifuge contains only a very small amount of polymer, a large amount of solvent and substantially all of the catalyst solids. This material is removed from the centrifuge through conduit 50 and introduced to the secondary underflow accumulator 54.

The net result of the aforedescribed two-stage centrifugation is to provide substantially complete separation between the polymer and catalyst removed from the polymerization reactor. This is accomplished as described, namely by operating two centrifuges in series with the first centrifuge being operated to provide maximum recovery of solids and the second centrifuge being operated to provide maximum recovery of polymer.

The catalyst and polymer in the secondary underflow accumulator are present in the form of a viscous, sticky sludge which is difficult to handle when wet and which when dry tends to form a hard mass which is hard to break up. In order to provide a more readily handled material, a quantity of dry catalyst is introduced to accumulator 54 through conduit 52 and mixed thoroughly with the accumulated underflow. The contents of the accumulator are withdrawn through conduit 56 and introduced to a conveyor drier 58 wherein solvent is separated from the catalyst by heating. The dry catalyst is withdrawn from the dryer through conduit 60 and the solvent is passed through conduit 62 and condenser 64 for suitable disposition.

The following data are presented to illustrate an application of the aforedescribed embodiment of the invention.

EXAMPLE I

Ethylene was polymerized in a continuous process in a 60 gallon reactor in the presence of a chromium oxide-silica-alumina catalyst containing 2.5 percent by weight of chromium. Prior to the reaction, the catalyst was activated in air by subjecting it to gradually increasing temperature up to 950° F. The operating conditions under which the polymer was formed were as follows:

Ethylene feed rate _____ 30 lb./hr.
Cyclohexane feed rate _____ 200 lb./hr.
Polymer concentration in reactor ___ 9.1 wt. percent.
Catlyst concentration in reactor ____ 0.062 wt. percent.
Pressure _____ 420 p.s.i.g.
Temperature _____ 285° F.
Residence time _____ 1.72 hours.

Following removal of unreacted ethylene the solution of polymer in ethylene was treated in a method similar to that of Figure 1 for the separation of polymer and catalyst. The centrifuge used was a standard Merco C–9 unit with a pressure enclosure around the housing of the centrifuge and a mechanical seal at the top (see Merco Catalogue Bulletin #4051, pages 1–4).

*Test data*

Centrifuge speed _____ 6650 r.p.m.
Centrifuge G's _____ 4,000.
Feed temperature _____ 300° F.
Pressure _____ 90 p.s.i.g. (20 p.s.i. nitrogen).

| | Feed Rate, Vol./Min. | Overflow-Underflow Ratio | Feed | | Overflow Percent [1] Catalyst |
| --- | --- | --- | --- | --- | --- |
| | | | Percent Polymer | Percent [1] Catalyst | |
| 1st Stage | 4.0 | 9.0 | 3.5 | 0.9 | 0.02 |
| 2d Stage | 4.0 | 9.0 | 3.5 | 8.0 | 0.26 |

[1] On a solvent-free basis.

The embodiment of Figure 1, as previously described, is directed to centrifugation under conditions of elevated temperature and pressure, followed by treatment of the catalyst product in a manner suitable to provide a material which can be easily handled. In the embodiment of Figure 2, another system is provided which utilizes catalyst agglomeration prior to the primary centrifuging step and also prior to drying the catalyst product. Referring to Figure 2, a primary centrifuge feed tank 66 is provided to which there is supplied a mixture of polymer, cyclohexane and catalyst obtained in the same manner as described in the discussion of Figure 1. The mixture is withdrawn from tank 66 through conduit 68, combined with cold solvent from conduits 80, 82 and 86 and thereafter introduced to primary centrifuge 72. The quantity and temperature of the cold solvent is such as to provide a reduction in temperature of the total mixture to a point below which the polymer begins to precipitate. The precipitated polymer causes the catalyst to agglomerate with the result that the catalyst is converted from small particles ranging in size from about 0.01 to about 100 microns to large agglomerated particles of 200 microns and larger which are more easily separated in the primary centrifuge. In this operation, the primary centrifuge 72 and the secondary centrifuge 100 are operated at sufficient pressure to prevent vaporization of solvent during centrifugation. For this purpose, nitrogen gas is admitted to the centrifuges through conduits 70 and 98, respectively. The overflow from the primary centrifuge, comprising polymer in solvent substantially free of catalyst solids, is removed therefrom through conduit 74 and is withdrawn from accumulator 76 through conduit 78. The underflow from the primary centrifuge, containing agglomerated catalyst and solvent is introduced to the primary underflow accumulator 90 through conduit 88 and from there passes through conduit 92 to secondary centrifuge 100. A requisite of the agglomeration step is that a portion of the polymer precipitate from solution and cause adherence of catalyst particles. The amount of polymer precipitated for this purpose can comprise a valuable percentage of the polymer product. In order to effect recovery of the polymer in the agglomerate, it is desirable that it be separated therefrom and returned to solution in cyclohexane. For this purpose, heated solvent is supplied from heater 94 through conduit 96 and combined with the primary centrifuge underflow prior to the entry of this stream to the secondary centrifuge 100. As in the process of Figure 1, the primary centrifuge is operated for maximum solid recovery and the secondary centrifuge is operated for maximum polymer recovery. As a result, the over-flow from the secondary centrifuge contains a quantity of solids which are recovered by recycling this stream to the primary centrifuge through conduit 84 for retreatment. In this specific embodiment of the invention, the concept of catalyst agglomeration is also employed to facilitate recovery of dry catalyst from the secondary centrifuge underflow. For this purpose, cold solvent is introduced to the secondary underflow accumulator through conduit 104. Again the quantity and temperature of the solvent are such that precipitation of polymer and catalyst agglomeration occur. Excess solvent can be decanted or otherwise removed following which final drying and complete solvent removal are effected in a conveyor dryer 110. If desired, dry catalyst or other solids can be added to the agglomerated catalyst prior to the drying operation.

Although the embodiments of Figures 1 and 2 comprise preferred embodiments of the invention, it is not intended that they be construed in any limiting sense and other apparatus and process arrangements can be used within the scope of the invention. For example, although final catalyst recovery in Figure 1 is effected by mixing dry catalyst with the secondary centrifuge underflow, this step can be effected by agglomerating the catalyst as in Figure 2, or by a combination of the two procedures. Also, while the use of a conveyor dryer has been shown for the recovery of solvent from the secondary centrifuge underflow, other suitable apparatus can be used for this purpose.

The following data is given in illustration of a typical commercial application of the embodiment of the invention shown in Figure 2.

EXAMPLE II

| Flow rates: | | Lb./hr. |
|---|---|---|
| Primary centrifuge feed (68) | | 17,900 |
| Composition: | | |
| Polymer | weight percent | 8.8 |
| Catalyst | do | 0.11 |
| Cyclohexane | do | 91 |
| Primary overflow (78) | | 38,840 |
| Composition: | | |
| Polymer | weight percent | 3.92 |
| Catalyst | do | 0.0004 |
| Cyclohexane | do | 96 |
| Primary underflow (88) | | 7,840 |
| Composition: | | |
| Polymer | weight percent | 4.2 |
| Catalyst | do | 0.26 |
| Cyclohexane | do | 96 |
| Secondary overflow (84) | | 14,710 |
| Composition: | | |
| Polymer | weight percent | 1.96 |
| Catalyst | do | 0.01 |
| Cyclohexane | do | .98 |
| Secondary underflow (102) | | 720 |
| Composition: | | |
| Polymer | weight percent | 7.0 |
| Catalyst | do | 2.8 |
| Cyclohexane | do | .90 |
| Cold solvent to primary centrifuge feed (82) | | 28,780 |
| Cold solvent to secondary underflow accumulator (104) | | 1,500 |
| Hot solvent to secondary centrifuge (96) | | 7,660 |
| Catalyst from dryer (112) | | 70 |
| Solvent from dryer (114) | | 2,150 |

| Temperatures: | °F. |
|---|---|
| Primary centrifuge (72) | 205 |
| Secondary centrifuge (100) | 300 |
| Cold solvent (82) | 56 |
| Hot solvent (96) | 396 |
| Dryer (110) | 200 |

| Pressures: | P.s.i.g. |
|---|---|
| Primary centrifuge (72) | 15 |
| Secondary centrifuge (100) | 63 |
| Dryer (110) | 2 |

Primary centrifuge feed obtained by polymerizing ethylene in the presence of the same type of catalyst and under the same operating conditions employed in Example I.

Having thus described the invention by providing specific examples thereof, it is to be understood that no undue restrictions or limitations are to be drawn by reason thereof and that many variations and modifications are clearly within the scope of the invention.

I claim:

1. A process for the separation of a solid catalyst comprising chromium oxide, containing hexavalent chromium, associated with a supporting material selected from the group consisting of silica, alumina, thoria, zirconia, and composites thereof from a solution of a polymer of a 1-olefin having a maximum of 8 carbon atoms per molecule and no branching nearer the double bond than the 4 position which comprises introducing said polymer solution containing said catalyst at a temperature between about 200° F. and about 400° F. to a first centrifuging zone maintained under superatmospheric pressure with an inert gas, removing from said zone as product a first stream comprising a substantially catalyst-free polymer solution, removing a second stream containing catalyst, solvent and polymer, introducing the second stream to a second centrifuging zone maintained under superatmospheric pressure with an inert gas, removing from the second zone a quantity of material containing polymer, solvent and a small amount of catalyst, recycling said material to the first centrifuging zone and removing from the second zone a stream comprising solvent, concentrated in catalyst.

2. In a process in which ethylene is converted to a solid polymer in the presence of a catalyst comprising chromium oxide, containing hexavalent chromium, associated with a supporting material selected from the group consisting of silica, alumina, thoria, zirconia and composites thereof, whereby a reaction product comprising catalyst, solvent and dissolved polymer is obtained, the improvement which comprises introducing the reaction product at a temperature between about 200 and about 400° F. to a first centrifuging zone pressured with an inert gas to provide a pressure therein maintained between about 25 p.s.i.g. and about 200 p.s.i.g., removing from said zone as product a first stream comprising a substantially catalyst-free polymer solution, removing a second stream containing catalyst, solvent and polymer, introducing the second stream to a second centrifuging zone pressured with inert gas to provide a pressure therein between about 25 p.s.i.g. and about 200 p.s.i.g., again separating catalyst and polymer, removing from the second zone a quantity of material containing polymer, solvent and a small amount of catalyst, recycling said material to the first centrifuging zone and removing from the second zone a stream containing solvent concentrated in catalyst and a small amount of polymer.

3. A process for the separation of a solid subdivided catalyst comprising chromium oxide, containing hexavalent chromium, associated with a supporting material selected from the group consisting of silica, alumina, thoria, zirconia, and composites thereof from a solution of a polymer of a 1-olefin having a maximum of 8 carbon atoms per molecule and no branching nearer the double bond than the 4 position, said solution being at a temperature between about 200° F. and about 400° F., which comprises cooling said solution containing said catalyst to a temperature level below the temperature at which polymer begins to precipitate from solution whereby agglomeration of catalyst and polymer takes place, introducing the agglomerate and solution to a first centrifuging zone maintained under superatmospheric pressure with an inert gas, removing from said zone as product a first stream comprising a substantially catalyst free polymer solution, removing a second stream containing agglomerated catalyst and solvent, increasing the temperature of the second stream to a level above the solution temperature of the precipitated polymer in the agglomerate whereby the polymer is redissolved, introducing the second stream to a second centrifuging zone maintained under superatmospheric pressure with an inert gas, removing from the second zone a quantity of material containing polymer, solvent and a small amount of catalyst, recycling said material to the first centrifuging zone, removing from the second zone a stream containing solvent concentrated in catalyst and a small amount of polymer, and further treating the concentrated catalyst stream for the separation of solvent and catalyst.

4. The process of claim 3 in which agglomeration is carried out at a temperature between about 190° F. and about 225° F.

5. In a process in which ethylene is converted to a solid polymer in the presence of a catalyst comprising chromium oxide containing hexavalent chromium associated with a supporting material selected from the group consisting of silica, alumina, thoria, zirconia and composites thereof whereby a reaction product comprising catalyst, solvent and dissolved polymer is obtained at a temperature between about 200° F. and about 400° F., the improvement which comprises cooling the reaction product to a temperature level below the temperature at which polymer begins to precipitate from solution whereby agglomeration of catalyst and polymer takes place, introducing the agglomerate and solution to a first centrifuging zone maintained under superatmospheric pressure with an inert gas, removing from said zone as product a first stream comprising a substantially catalyst free polymer solution, removing a second stream containing agglomerated catalyst and solvent, increasing the temperature of the second stream to a level above the solution temperature of the precipitated polymer in the agglomerate whereby the polymer is redissolved, introducing the second stream to a second centrifuging zone maintained under superatmospheric pressure with an inert gas, removing from the second zone a quantity of material containing polymer, solvent and a small amount of catalyst, recycling said material to the first centrifuging zone, removing from the second zone a stream containing solvent concentrated in catalyst and a small amount of polymer, and further treating the concentrated catalyst stream for the separation of solvent and catalyst.

6. A process for the separation of a solid catalyst comprising chromium oxide, containing hexavalent chromium, associated with a supporting material selected from the group consisting of silica, alumina, thoria, zirconia, and composites thereof from a solution of a polymer of a 1-olefin having a maximum of 8 carbon atoms per molecule and no branching nearer the double bond than the 4 position which comprises introducing the polymer solution containing said catalyst at a temperature between about 200° F. and about 400° F. to a first centrifuging zone maintained under superatmospheric pressure with an inert gas, removing from said zone as product a first stream comprising a substantially catalyst-free polymer solution, removing a second stream containing catalyst, solvent and polymer, introducing the second stream to a second centrifuging zone maintained under superatmospheric pressure with an inert gas, removing from the second zone a quantity of material containing polymer, solvent and a small amount of catalyst, recycling said material to the first centrifuging zone, removing from the second zone a stream containing solvent concentrated in catalyst and a small amount of polymer, introducing to the concentrated catalyst stream a quantity of dry subdivided solids and further treating said stream for the separation of solvent therefrom.

7. In a process in which ethylene is converted to a solid polymer in the presence of a catalyst comprising chromium oxide, containing hexavalent chromium, associated with a supporting material selected from the group consisting of silica, alumina, thoria, zirconia and composites thereof whereby a reaction product comprising catalyst, solvent and dissolved polymer is obtained, the improvement which comprises introducing the reaction product at a temperature between about 200 and about 400° F. to a first centrifuging zone pressured with an inert gas to provide a pressure therein between about 25 p.s.i.g. and about 200 p.s.i.g., removing from said zone as product a first stream comprising a substantially catalyst-free polymer solution, removing a second stream containing catalyst, solvent and polymer, introducing the second stream to a second centrifuging zone pressured with inert gas to provide a pressure therein between about 25 p.s.i.g. and about 200 p.s.i.g., removing from the second zone a quantity of material containing polymer, solvent and a small amount of catalyst, recycling said material to the first centrifuging zone, removing from the second zone a stream containing solvent concentrated in catalyst and a small amount of polymer, adding dry subdivided solids to the concentrated catalyst stream and further treating said stream for the separation of solvent therefrom.

8. A process for the separation of a solid subdivided catalyst comprising chromium oxide, containing hexavalent chromium, associated with a supporting material selected from the group consisting of silica, alumina, thoria, zirconia, and composites thereof from a solution of a polymer of 1-olefin having a maximum of 8 carbon atoms per molecule and no branching nearer the double bond than the 4 position, said solution being at a temperature between about 200° F. and about 400° F., which comprises cooling said solution containing said catalyst to a temperature level below the temperature at which polymer begins to precipitate from solution whereby agglomeration of catalyst and polymer takes place, introducing the agglomerate and solution to a first centrifuging zone maintained under superatmospheric pressure with an inert gas, removing from said zone as product a first stream comprising a substantially catalyst free polymer solution, removing a second stream containing agglomerated catalyst and solvent, increasing the temperature of the second stream to a level above the solution temperature of the precipitated polymer in the agglomerate whereby the polymer is redissolved, introducing the second stream to a second centrifuging zone maintained under superatmospheric pressure with an inert gas, removing from the second zone a quantity of material containing polymer, solvent and a small amount of catalyst, recycling said material to the first centrifuging zone, removing from the second zone a stream containing solvent concentrated in catalyst and a small amount of polymer, cooling the concentrated catalyst stream to a temperature level below the temperature at which the polymer contained therein precipitates from solution whereby agglomeration of catalyst and polymer takes place and further treating the cooled material for the separation of solvent therefrom.

9. In a process in which ethylene is converted to a solid polymer in the presence of a catalyst comprising chromium oxide containing hexavalent chromium associated with a supporting material selected from the group consisting of silica, alumina, thoria, zirconia and composites thereof whereby a reaction product comprising catalyst, solvent and dissolved polymer is obtained at a temperature between about 200° F. and about 400° F., the improvement which comprises cooling the reaction product to a temperature level below the temperature at which polymer begins to precipitate from solution whereby agglomeration of catalyst and polymer takes place, introducing the agglomerate and solution to a first centrifuging zone maintained under superatmospheric pressure with an inert gas, removing from said zone as product a first stream comprising a substantially catalyst free polymer solution, removing a second stream containing agglomerated catalyst and solvent, increasing the temperature of the second stream to a level above the solution temperature of the precipitated polymer in the agglomerate whereby the polymer is redissolved, introducing the second stream to a second centrifuging zone maintained under superatmospheric pressure with an inert gas, separating catalyst and polymer in said second zone, removing from the second zone a quantity of material containing polymer, solvent and a small amount of catalyst, recycling said material to the first centrifuging zone, removing from the second zone a stream containing solvent concentrated in catalyst and a small amount of polymer, cooling said stream to a temperature level below the temperature at which the polymer contained therein precipitates from solution whereby agglomeration of catalyst and polymer takes place and further treating the cooled material for the separation of solvent therefrom.

10. A process for the separation of a solid catalyst comprising chromium oxide, containing hexavalent chromium, associated with a supporting material selected from the group consisting of silica, alumina, thoria, zirconia, and composites thereof from a solution of a polymer of 1-olefin having a maximum of 8 carbon atoms per molecule and no branching nearer the double bond than the 4 position which comprises introducing the polymer solution containing said catalyst at a temperature between about 200° F. and about 400° F. to a first centrifuging zone maintained under superatmospheric pressure with an inert gas, removing from said zone as product a first stream comprising a substantially catalyst-free polymer solution, removing a second stream containing catalyst, solvent and polymer, introducing the second stream to a second centrifuging zone maintained under superatmospheric pressure with an inert gas, again separating catalyst and polymer, removing from the second zone a quanity of material containing polymer, solvent and a small amount of catalyst, recycling said material to the first centrifuging zone, removing from the second zone a stream containing solvent concentrated in catalyst and a small amount of polymer, cooling said stream to a temperature level below the temperature at which the polymer contained therein precipitates whereby agglomeration of catalyst and polymer takes place and further treating the cooled material for the separation of solvent therefrom.

11. A process for the separation of a solid subdivided catalyst comprising chromium oxide, containing hexavalent chromium, associated with a supporting material selected from the group consisting of silica, alumina, thoria, zirconia, and composites thereof from a solution of a polymer of 1-olefin having a maximum of 8 carbon atoms per molecule and no branching nearer the double bond than the 4 position, said solution being at a temperature between about 200° F. and about 400° F., which comprises cooling said solution containing said catalyst to a temperature level below the temperature at which polymer begins to precipitate from solution whereby agglomeration of catalyst and polymer takes place, introducing the agglomerate and solution to a first centrifuging zone maintained under superatmospheric pressure with an inert gas, removing from said zone as product a first stream comprising a substantially catalyst free polymer solution, removing a second stream containing agglomerated catalyst and solvent, increasing the temperature of the second stream to a level above the solution temperature of the precipitated polymer in the agglomerate whereby the polymer is redissolved introducing the second stream to a second centrifuging zone maintained under superatmospheric pressure with an inert gas, removing from the second zone a quantity of material containing polymer, solvent and a small amount of catalyst, recycling said material to the first centrifuging zone, removing from the second zone a stream containing solvent concentrated in catalyst and a small amount of polymer, introducing dry subdivided solids to the concentrated catalyst stream and further treating said stream for the separation of solvent therefrom.

References Cited in the file of this patent
UNITED STATES PATENTS

| | | |
|---|---|---|
| 2,333,190 | McKinnis | Nov. 2, 1943 |
| 2,539,915 | Lindgren | June 30, 1951 |
| 2,565,960 | Garber et al. | Aug. 28, 1951 |
| 2,691,647 | Field et al. | Oct. 12, 1954 |
| 2,692,261 | Peters et al. | Oct. 19, 1954 |
| 2,795,635 | McBride | June 11, 1957 |
| 2,825,721 | Hogan et al. | Mar. 4, 1958 |

OTHER REFERENCES

"Chemical Engineering," (Flood), vol. 62, June 1955, pp. 217–227.